June 5, 1945. J. A. TALALAY 2,377,590
APPARATUS FOR DETERMINING HARDNESS
Filed May 14, 1943 3 Sheets-Sheet 2

Inventor
Joseph A. Talalay
by Roberts, Cushman & Woodbury
Att'ys.

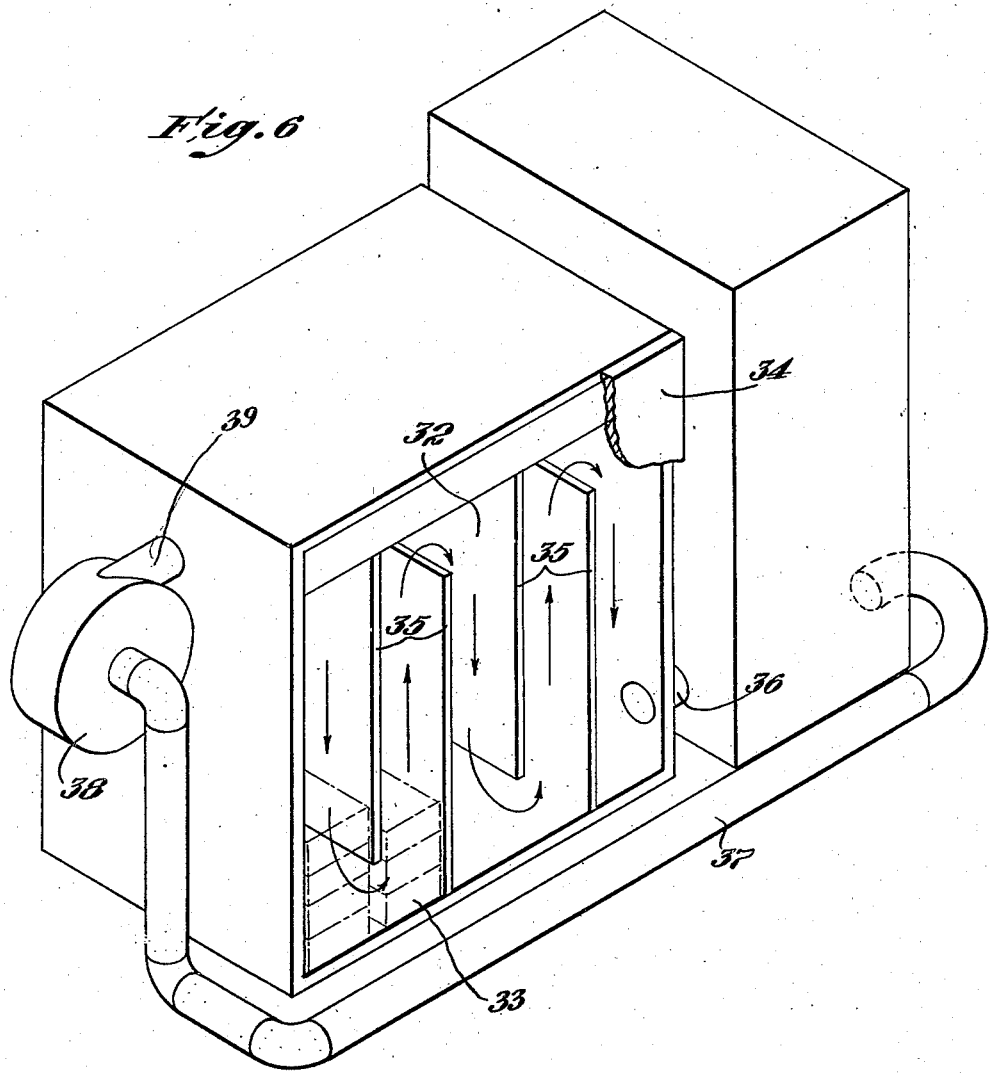

Patented June 5, 1945

2,377,590

UNITED STATES PATENT OFFICE 2,377,590

APPARATUS FOR DETERMINING HARDNESS

Joseph A. Talalay, Boston, Mass., assignor to Converse Rubber Company, Malden, Mass., a corporation of Massachusetts Application May 14, 1943, Serial No. 486,977

6 Claims. (Cl. 73—78)

The present invention provides an apparatus for determining the hardness of rubber and like plastic or elastic materials, and under predetermined conditions.

The hardness of solid material has heretofore been measured in terms of the resistance which they present to penetration, or to abrading, breaking, cutting or twisting a portion of the material away from the rest of the mass.

It is now discovered that the property of hardness is more accurately and more readily ascertained by determining the deformation of the material in question by carefully measuring the amount (and rate) of deformation which it undergoes upon the application of a fixed load, which is just sufficient to effect an initial and observable degree of deformation of the material under test.

The amount of such initial deformation and the force required to effect it is a measure of the force or tenacity with which the ultimate molecular structure of the material is held together. This is the same kind of force as that which resists penetration, abrasion, breaking, cutting or twisting a portion of the material away from the rest of the material with which it is associated in its solid conformation. The forces required for such initial distortion of a solid are generally much less, (especially with plastic and elastic materials) than that required for disruption. Moreover, they are more susceptible to the peculiar and particular properties and characteristics of each solid material and of each sample thereof than are the ultimate forces of complete fracture, which are measured and determined by the practices of the prior art.

In the present invention it is taken into account that the hardness of a material is profoundly influenced by the surrounding atmospheric conditions, and that the hardness which it manifests under test will be directly affected by the conditions to which it is subjected when the test is made.

It is accordingly an object of the present invention to provide apparatus for measuring the hardness of solid material preferably under controlled and standardized atmospheric conditions. It is also an object to provide an apparatus in which tests may be conducted upon a plurality of samples of the same material or different materials, which, both previously and during the test, are conditioned to the same atmospheric surroundings. Other objects of the invention will appear from the following disclosure and claims.

In accordance with the present invention, therefore, a sample of the material to be tested is first prepared, preferably of uniform composition, structure and surface characteristics, size and shape, and a stress is applied thereto which is just sufficient to equal and slightly exceed its resistance to deformation. In other words the force or stress applied is predetermined for any given kind of material, and approximates or slightly exceeds the threshold value, that is, the force at which the sample in question undergoes an initial strain or deformation, which—at least upon multiplication or magnification of its degree—may be observed and measured.

The force applied to the sample or samples under test should be predetermined in each case. For comparative purposes all of the tests should be conducted under the same conditions and upon samples which have been brought to and maintained under conditions for a sufficient length of time to assure stability of their several properties, variations of which might affect the tests and the results to be obtained.

The conditions applied to the material during test may be standardized merely for the sake of the convenience of obtaining them from time to time, such as average atmospheric conditions, of temperature, pressure, humidity, etc. On the other hand conditions may be standardized to magnify their effects upon the material, or to simulate special conditions which the materials are known or suspected to undergo, in manufacture or in the particular uses for which they are intended, such as elevated temperatures, high humidity, low temperatures, etc.

In either case, whether substantially normal conditions, or the simulation abnormal conditions are to be imposed upon the samples for the purpose of test, it is important if not essential that they be definitely provided and maintained and also that each of the samples under test shall fully acquire such conditions, and that all of the samples under test shall be equally preconditioned before and throughout testing operations. Otherwise the results cannot be expected to be concordant on like samples nor comparable with respect to unlike samples.

A typical instance of the application of the invention will be described with reference to the determination of the hardness of rubber, for example as carried out in the apparatus of the invention, as illustrated in the accompanying drawings, in which:

Fig. 6 is a view of an auxiliary device for providing low temperatures in the testing apparatus.

In operation of the apparatus shown, the double walled, insulated cover 1 is lifted off from the side walls 2, 3 of the case which are also double-walls, with heat insulating material (or vacuum) therebetween. Likewise the bottom of the case 4 is suitably insulated. The front wall (not shown) is preferably transparent, as of two sheets of glass, with a vacuum between them, or merely a hermetically sealed air space will be effective.

Figure 1:
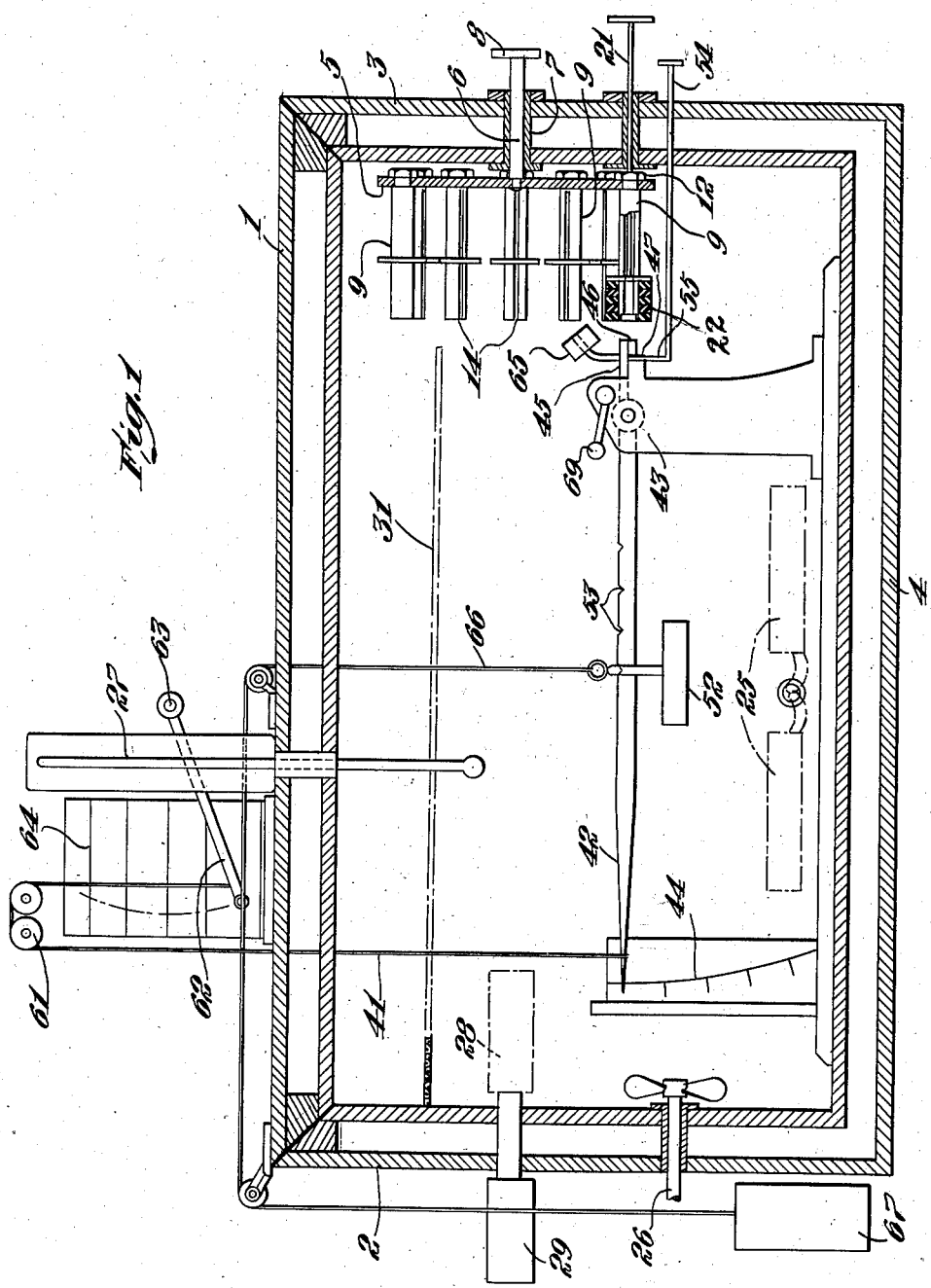
Fig. 1 is a front elevation of a rectangular cabinet or case having the testing apparatus therein.
Figure 2:
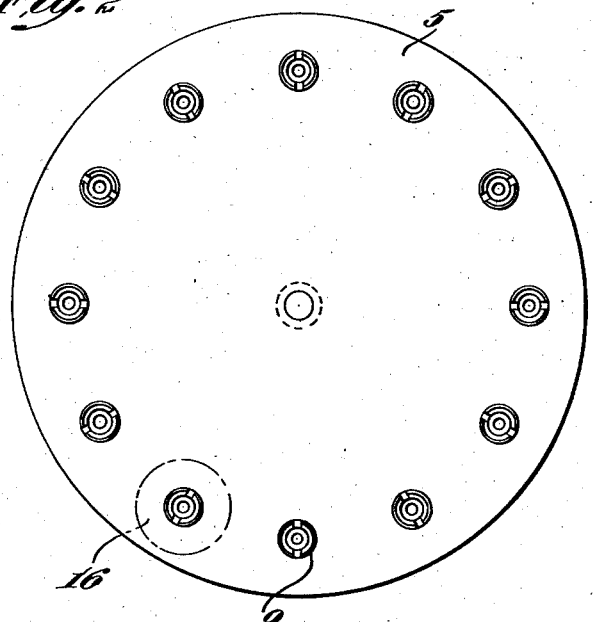
Fig. 2 is a view of a holder for the samples to be tested.
Figure 4:
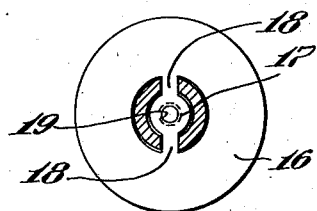
Fig. 4 is a detail of a disc used in transferring the rings from the holder to the testing apparatus.
Figure 3:
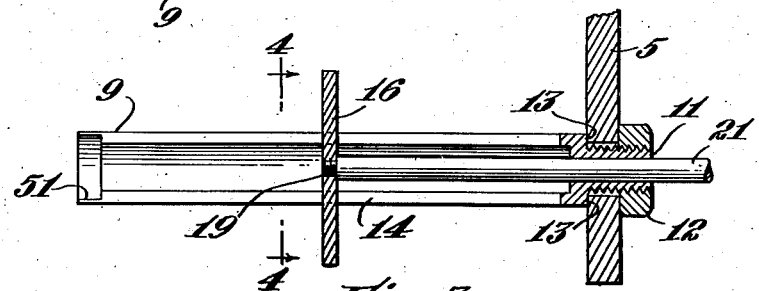
Fig. 3 is a detail of the holder, upon which the rings are held during conditioning and in readiness for testing.

The carrier for the samples to be tested—which in the instant case are in the form of rings 2" outside diameter, ½" inside diameter and ¼" thick—comprises a large disc 5 centrally mounted, in a vertical plane, at one end of the case upon an arbor 6 which passes through a sleeve 7 passing through the end wall 3 of the case and is provided with a handle 8 on the outer end whereby it may be rotated and also advanced and retracted. Mounted around the periphery of the disc are a row of horizontal tubes, 9, 9, each having a reduced screw threaded end 11, passing through the disc and received by a nut 12 screw threaded on the outer end to engage and hold the disc against the shoulder 13 (Fig. 3). The inner end of each tube has a split 14 diametrically thereof and running almost the entire length of the tube as shown in Figs. 1 and 3. This split is disposed radially of the disc holder and permits slipping a metal disc 16 (Fig. 4) over the tube. The disc 16 may be about 2" in diameter and has an opening large enough to fit over the tube 9. It has a solid center 17, adapted to slide in the open portion or core of the tube 9 and a spider 18 which joins the outer and central portions of the disc and is adapted to slide in the longitudinal slit 14 of the tube as shown in Figs. 1 and 3. The central portion of the disc 17 is bored and threaded at 19 so that when the disc holder 5 is rotated to bring each tube 9 into lowermost position, as shown in Fig. 1, a rod 21 passing through the end wall of the case and having a screw thread on its inner end, may be inserted into the tube 9 and then threaded into the center 19 of the disc 17.

A plurality of rubber rings 22 are loaded upon the tubes 9, by pushing each disc 16 back to the end of the slit and slipping them over the free end of the tube until each tube has received as many as it will carry or as many as are to be tested.

The cover of the case 1 is then replaced on the top and the case readjusted to the desired conditions under which the samples are to be tested. This may be done with respect to elevated temperatures, by means of electric resistance heaters 25 in the bottom of the case and the heated air circulated rapidly through the case by means of the electric fan 26, and regulated by observing the temperature with a thermometer 27 or by automatic control of a thermostat 28, suitably connected to the resistance heater through switch 29 in well known ways.

The samples 22 as thus positioned and stored are left under the controlled conditions of the cabinet for a prolonged period of time, so that they will be equally and uniformly brought to the required condition for test, and stabilized to those conditions.

If low temperatures are required, suitable cooling agents may be introduced, such as dry ice upon the screen 31, which upon evaporation will lower the temperature which in turn may be observed by the thermometer 27. In this way the cabinet will reach and maintain a temperature as low as $-50°$ C. or lower, i. e. $-75°$ C.

Cooling of the chamber may, however, be effected by an auxiliary device shown in Fig. 6, in which a reservoir 32 is provided with lumps or blocks of dry ice 33 in the compartments of a heat-insulated box, having a cover 34, and partitions 35 which alternately descend from the top of the box and come up from the bottom of the box, thus defining a continuous path past the blocks of dry ice in all of the compartments as indicated by arrows. The evaporated carbon dioxide gas is thus drawn off from the solid material, and then passed through conduit 36, which may pass through the wall of the testing cabinet at any convenient location. The carbon dioxide gas is withdrawn from the cabinet by a second conduit 37, leading through and from another portion of the testing cabinet wall and to a pump 38, which forces it into the dry ice cabinet at the opposite end through the conduit 39.

The pump 38 may be electrically driven and controlled by the thermostat regulator 29 in the same way as the resistance heater, in terms of the recorded temperature of the atmosphere of the testing cabinet.

When the atmosphere of the cabinet has been brought to the desired temperature, and composed of either air or carbon dioxide, and the samples also have been brought to and sufficiently stabilized at such conditions, a hook 41, passing through the top wall may be engaged with the lever arm 42—which is pivoted upon the fixed upright 43, so as to swing in a vertical plane—to a horizontal position, as shown on the vertical scale 44, adjacent to its free end. This movement brings the opposite end of the lever 45 downward against a boss, 46, which is permanently mounted on the fixed upright, 43, and projects parallel to the lever 45. The short end of the lever 45 and the boss 46, in this positon, are adapted to receive one of the rubber rings 22, to be slipped thereover, and positioned against the shoulder 47, thereon.

Figure 5:
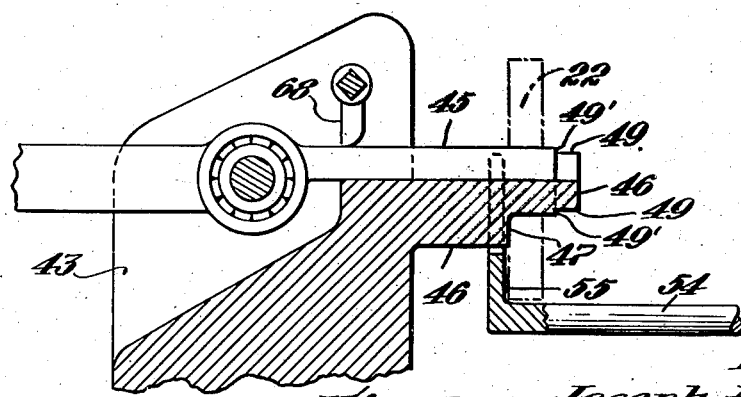
Fig. 5 is an enlarged detail view of the lever and boss showing a rubber ring in position thereon, ready for testing, in dotted lines.

This is done by inserting the rod 21 through the tube 9 (which stands in its lowermost position directly opposite to the boss 46 and lever end 45) screwing its inner end into the disc 16, and then advancing the rod sufficiently to make the disc push the rubber sample rings 22 along the outside of the tube 9 and the end ring 22, to slip off the tube and over the lever end 45 and the boss 46, as shown in Fig. 5. Such transfer may be further assured by advancing the disc holder 5 toward the lever. It is also made more positive by providing reduced portion 49 and shoulder 49' upon the free ends of the boss and of the lever end 45, over which the free open end 51 of the tube 9 is adapted to fit. This makes the surfaces of the boss and of the lever end continuous with the outer surface of the tube 9 so that there will be no obstruction to the passage of the rubber ring 22 from the one to and over the other.

When the ring 22 is thus moved over the fixed bar 46 and the free end of the lever 45 as shown in Fig. 5—and firmly in position against the shoulder 47—the disc holder 5 and tube 9 are retracted. The hook 41 is now released and the long end of the lever, 42, under its own weight or the weight of a predetermined load, such as the bob 52, applied at a predetermined position from the fulcrum along the scale 53, bears downwardly, forcing the short end 45 upwardly, thus tending to elongate the rubber ring 22 between it and the fixed bar 46. The amount of such movement may be read directly upon the scale 44.

The lever may then again be raised by the hook 41, releasing the tension upon the sample ring, which may then be drawn off from the end of the lever and the boss, by a rod 54, passing through the end of the case, having a fork or bifurcated end 55, passing over the boss 46 between the ring 22 and the upright 43, and pulling it free. Thereupon the tested ring drops onto the bottom of the case. But, if a tube 9 (which is preferably empty of rings to be tested), is brought into registry with the tested ring, the latter may be retracted onto this tube, and thus left mounted on the holder 5 for further test; such as determining the state of cure or scorching over a period of time, or for withdrawal from the cabinet of all the rings together, or further investigation under other sets of conditions, i. e.—higher temperatures or lower temperatures. Another sample ring 22 may be put into position and tested, without disturbing any of the conditions under which they are all continuously maintained.

The ring may be tested at various periods of time, thus determining the effects of the conditions to which they are subjected in the cabinet.

If instead of vulcanizing rubber rings, unvulcanized rubber rings are tested, for the purpose of finding out how the hardness increases with the rise of temperature and time, i. e., we can follow up the process of vulcanization of the sample or compound. This is very important in the determination of the scorching properties of special compounds used for extruding purposes, for example, and to give the relative susceptibilities of such samples to scorching.

While the hook 41 may be simply manually operated as above described, it may also comprise a flexible cord, passing over pulleys 61, and down and fastened to a pencil or other marking device 62, pivoted at 63, and adapted to bear and mark upon a sheet of coordinate paper 64, which may be automatically traversed horizontally, during the test, so that the trace of the marker 62 thereon will form a graph representing the movement of the lever 42 throughout the time of test.

In order to provide a more accurate control of the lever 42, it may be counterpoised by a weight 65 on the short end 45. The bob 52 may also be counterpoised through the flexible cord 66 to a weight 67, outside of the cabinet. The lever may also be held in horizontal or neutral position by the cam 68 (Fig. 5) through the crank lever 69, likewise passing to the outside of the cabinet for independent control.

The purpose of the counterpoise 67 is to relieve the lever of the weight of the bob 52, after the preliminary test, so that the lever 42 will go back toward its zero position under the influence of contraction of the sample. By this procedure, the permanent set of the sample due to the stress imposed upon it can be determined and automatically recorded by a reading on the scale 44 or on the graph of the coordinate paper 64.

Moreover, one may repeat the operation, in this way on the same sample and thus determine and measure the effects of flexing and fatigue upon the sample under a given load and stretching.

I claim:

1. Apparatus for determining the hardness and related properties of plastic and elastic materials, comprising a thermally insulated, hermetically closed container, a transparent aperture therein, an adjustable holder for carrying a plurality of samples of the material to be tested, means for receiving a sample from said holder, means, operable through the wall of the container without opening the container, for transferring a sample from the holder to the receiving means, and means operable from the outside of the container for subjecting the sample on the receiving means to a predetermined stress without opening the container.

2. Apparatus for determining the hardness and related properties of plastic and elastic materials, comprising a closed container, having thermally and hermetically insulated walls, a transparent aperture therein, a holder for a plurality of samples to be tested, a pivoted lever and a fixed boss, adapted to receive and engage a sample of the material, over the lever and boss, means operable from the outside of the container for selectively moving a sample from the holder to the lever and fixed boss, means for imparting a predetermined load to the lever, thereby to stress the sample therein, and means for measuring the amount of deformation of the sample by said stress, visible through the transparent aperture of the container.

3. Apparatus for measuring the hardness and related properties of rubber and rubber-like materials, comprising a thermally and hermetically closed case, having a transparent aperture, a holder therein adapted to receive and retain a plurality of rubber rings, a fixed boss and a pivoted lever, said boss and lever being adapted to receive one of said rubber rings, means operable from outside the container for selectively transferring one of the rubber rings from the holder over the lever and fixed boss, means operable from outside the container for applying a fixed load or stress to said lever, tending to separate the end thereof from the fixed boss, and a scale adjacent to the lever and observable through the aperture of the container, for measuring the movement of the lever and the hardness of the sample.

4. Apparatus for measuring the hardness and related properties of rubber and rubber-like materials, comprising a thermally and hermetically closed case, having a transparent aperture, a holder therein adapted to receive and retain a plurality of rubber rings, a fixed boss and a pivoted lever, said lever and boss being adapted to receive one of said rubber rings, means operable from outside the container for selectively transferring one of the rubber rings from the holder over the lever and fixed boss, means operable from outside the container for applying a fixed load or stress to said lever, tending to separate the end thereof from the fixed boss, and a scale adjacent to the lever and observable through the aperture of the container, for measuring the movement of the lever and the hardness of the sample, and temperature-indicating and regulating means within the container.

5. Apparatus for measuring the hardness and related properties of rubber and rubber-like materials, comprising a thermally and hermetically closed case, having a transparent aperture, a holder therein adapted to receive and retain a plurality of rubber rings, a fixed boss and a pivoted lever, adapted to receive one of said rubber rings, means operable from outside the container for selectively transferring one of the rubber rings from the holder over the lever and fixed boss, means operable from outside the container for applying a fixed load or stress to said lever, tending to separate the end thereof from the fixed boss, and a scale adjacent to the lever and observable through the aperture of the container, for measuring the movement of the lever and the hardness of the sample and means for regulating and maintaining the temperature within the container to a predetermined value between approximately $-70°$ and $+250°$ C.

6. Apparatus for measuring the hardness and related properties of rubber and rubber-like materials, comprising a thermally and hermetically closed case, having a transparent aperture, a holder therein adapted to receive and retain a plurality of rubber rings, a fixed boss and a pivoted lever, adapted to receive one of said rubber rings, means operable from outside the container for selectively transferring one of the rubber rings from the holder over the lever and fixed boss, means operable from outside the container for applying a fixed load or stress to said lever, tending to separate the end thereof from the fixed boss, and a scale adjacent to the lever and observable through the aperture of the container, for measuring the movement of the lever and the hardness of the sample and means for continuously recording the movement of said lever over a period of time.

JOSEPH A. TALALAY.